United States Patent
Kishino et al.

[15] 3,683,053
[45] Aug. 8, 1972

[54] O-ALKYL-O-ALKYLPHENYL-S-ALKOXYETHYL-PHOSPHOROTHIOLATES

[72] Inventors: Shigeo Kishino; Yasuo Yamada; Akio Kudamatsu; Shozo Sumi, all of Tokyo; Kozo Shiokawa, Kanagawa, all of Japan

[73] Assignee: Farbenfabriken Bayer Aktiengesellschaft, Leverkusen, Germany

[22] Filed: Sept. 14, 1970

[21] Appl. No.: 72,114

[52] U.S. Cl. ............260/950, 260/964, 260/973, 260/979, 424/217
[51] Int. Cl. ...........................C07f 9/12, A01n 9/36
[58] Field of Search........................260/950

[56] References Cited

FOREIGN PATENTS OR APPLICATIONS 624,475   9/1961   Italy...........................260/950

Primary Examiner—Joseph Rebold
Assistant Examiner—Anton H. Sutto
Attorney—Burgess, Dinklage & Sprung

[57] ABSTRACT

O-alkyl-O-alkylphenyl-S-alkoxyethyl-phosphorothiolates of the formula

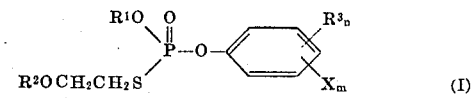

(I)

in which
R$^1$, R$^2$ and R$^3$ are lower alkyl radicals,
X is halogen,
$m$ is 0 to 3, and
$n$ is 1 or 2,
which possess insecticidal and fungicidal properties, compositions containing such phosphorothiolates and the method of combating insects and fungi using such phosphorothiolates.

11 Claims, No Drawings

O-ALKYL-O-ALKYLPHENYL-S-ALKOXYETHYL-PHOSPHOROTHIOLATES

The present invention relates to and has for its objects the provision of particular new O-alkyl-O-alkylphenyl-S-alkoxyethyl-phosphorothiolates, e.g. the alkyl radicals are lower alkyl and the phenyl ring may contain one or two such radicals and up to three halogen atoms, which possess insecticidal and fungicidal properties, active compositions in the form of mixtures of such compounds with solid and liquid dispersible carrier vehicles, and methods for producing such compounds and for using such compounds in a new way especially for combating insects and fungi, with other and further objects becoming apparent from a study of the within specification and accompanying examples.

It has now been found in accordance with the present invention, that the particular new O-alkyl-O-alkylphenyl-S-alkoxyethyl-phosphorothiolates of the formula $$\begin{array}{c} R^1O \\ \diagdown \\ R^2OCH_2CH_2S \end{array} \begin{array}{c} O \\ \| \\ P-O- \end{array} \underset{X_m}{\underset{}{\bigcirc}} R^3{}_n \qquad (I)$$

in which
R$^1$, R$^2$ and R$^3$ are lower alkyl radicals,
X is halogen,
m is 0 to 3, and
n is 1 or 2,
exhibit strong insecticidal and fungicidal properties.

It has furthermore been found, in accordance with the present invention, that the particular new compounds of formula (I) above may be produced by the following two processes of which the first is particularly advantageous. In process variant (a) a compound of the formula $$\begin{array}{c} R^1O \\ \diagdown \\ R^2OCH_2CH_2S \end{array} \begin{array}{c} O \\ \| \\ P-Hal \end{array} \qquad (II)$$

is reacted with a compound of the formula $$MO-\underset{X_m}{\underset{}{\bigcirc}} R^3{}_n \qquad (III)$$

or in process variant (b) a compound of the formula $$\left[ X_m \underset{R^3{}_n}{\underset{}{\bigcirc}} \begin{array}{c} R^1O \\ \diagdown \\ -O \end{array} \begin{array}{c} O \\ \diagup \\ P \\ \diagdown \\ S \end{array} \right] \cdot M' \qquad (IV)$$

is reacted with a compound of the formula $$Hal-CH_2CH_2-O-R^2 \qquad (V)$$

in which R$^1$, R$^2$, R$^3$, X, m and n have the same meanings as above, M is hydrogen, a metal equivalent or ammonium, M' is a metal equivalent or ammonium and Hal is halogen.

Advantageously in accordance with the present invention, in the various formulas set forth herein:

R$^1$, R$^2$, R$^3$, are alkyl of one to four carbon atoms, for example methyl, ethyl, n- or iso-propyl, n-, iso-, sec.- or tert.-butyl radical. R$^1$ is preferably methyl or ethyl, R$^2$ is preferably methyl, ethyl, or n-(or iso-)propyl, R$^3$ is preferably methyl;

X, which is halogen, such as chlorine, bromine, fluorine or iodine, is preferably chlorine or bromine;

M, which is hydrogen, ammonium or a metal, such as sodium, potassium, lithium, etc., is preferably hydrogen, sodium, potassium or ammonium;

M', which is ammonium or a metal, such as sodium, potassium, lithium, etc., is preferably sodium, potassium or ammonium;

m, is 0 to 3, preferably 0 to 2, n, is 1 or 2 and

Hal, which is halogen such as chlorine, bromine, fluorine or iodine, is preferably chlorine, bromine.

Surprisingly, the particular new phosphorothiolates of formula (I) above according to the present invention exhibit broad activity against both insect pests and harmful fungi. These compounds are also active against mites which are resistant to organic phosphorus chemicals. Furthermore, as these compounds are free from heavy metals such as that in organic mercury chemicals, there is no need to worry about a residual toxicity in harvested crops. Another advantage of these compounds is that they exhibit low mammalian toxicity compared to Parathion.

The general process for the preparation of the instant compounds pursuant to process variant (a) is illustrated by the following reaction scheme:

$$\begin{array}{c} R^1O \\ \diagdown \\ R^2OCH_2CH_2S \end{array} \begin{array}{c} O \\ \| \\ P-Hal \end{array} + MO-\underset{X_m}{\underset{}{\bigcirc}} R^3{}_n \longrightarrow$$

(II) \hspace{2cm} (III)

$$\begin{array}{c} R^1O \\ \diagdown \\ R^2OCH_2CH_2S \end{array} \begin{array}{c} O \\ \| \\ P-O- \end{array} \underset{X_m}{\underset{}{\bigcirc}} R^3{}_n + M \cdot Hal \qquad (VI)$$

(I)

in which R$^1$, R$^2$, R$^3$, X, M, Hal, m and n have the same meanings as above.

The O-alkyl-S-(2-alkoxy)ethyl thiolphosphoryl halide of formula (II) which is the starting material according to process variant (a), may be prepared according to conventional methods, for example, by treating S-(2-alkoxy) ethyl thiolphosphoryl dihalide with a corresponding alcohol with the use of an inert solvent or diluent. This reaction may be carried out in the presence of an acid-binding agent or by using a metal salt of the corresponding alcohol instead of the acid-binding agent.

As examples of O-alkyl-S-(2-alkoxy)ethyl thiolphosphoryl halides represented by the said general formula (II) which may be used there are mentioned:
O-methyl-S-(2-ethoxy)ethylthiolphosphorylchloride,
O-ethyl-S-(2-methoxy)ethylthiolphosphorylchloride,
O-ethyl-S-(2-ethoxy)ethylthiolphosphorylchloride,
O-ethyl-S-[2-n(or iso-)-propoxy]ethylthiolphosphoryl-chloride,
O-ethyl-S-(2-n-butoxy)ethylthiolphosphorylchloride,
O-n-butyl-S-(2-ethoxy)ethylthiolphosphorylchloride, and the like.

As examples of phenols of the formula (III) which may be used as starting materials per se or in the form of their salts, such as sodium, potassium or ammonium, there are mentioned:

2-(3- or 4-)cresol,
2-iso-propylphenol,
2-sec.-butylphenol,
4-tert.-butylphenol,
2,4-dimethylphenol,
3,4-dimethylphenol,
3,5-dimethylphenol,
2-iso-propyl-5-cresol,
2-chloro-4-cresol,
2-chloro-6-cresol,
4-chloro-2-cresol,
4-chloro-3-cresol,
2-chloro-4-tert.-butylphenol,
3,5-dimethyl-4-chlorophenol,
2,4-dichloro-6-cresol, and the like.

The reactants may be reacted directly or in the presence of an inert solvent or diluent including aliphatic or aromatic hydrocarbons (which may be halogenated), for example benzine, chlorinated methylene, chloroform, carbon tetrachloride, benzene, chlorobenzene, toluene, xylene, etc.; ethers, for example diethyl ether, dibutyl ether, dioxane, tetra-hydrofurane, etc.; aliphatic alcohols or ketones with low boiling points, for example methanol, ethanol, iso-propanol, acetone, methyl ethyl ketone, methyl iso-propyl ketone, methyl iso-butyl ketone; lower aliphatic nitriles such as acetonitrile, propionitrile; and the like.

The reaction may be carried out in the presence of an acid-binding agent. For this purpose, alkali metal car-bonates, bicarbonates and alcoholates, such as potassium carbonate and sodium methylate and ethylate and tertiary amines of aliphatic hydrocarbons, aromatic hydrocarbons and heterocyclines such as triethyl amine, diethyl aniline, pyridine, and the like, can be used.

The reaction can be carried out within a fairly wide temperature range, but in general at temperatures from about 0° to 110° C, and preferably from about 10° to 80° C.

The general process pursuant to variant (b) is illustrated by the following reaction scheme:

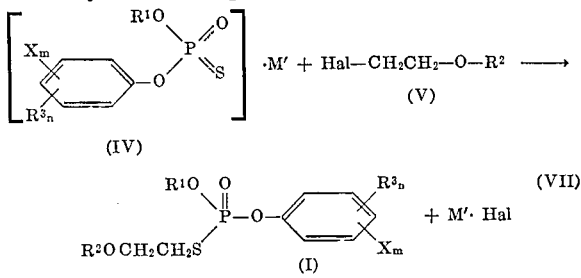

wherein $R^1$, $R^2$, $R^3$, X, M,' $m$ and $n$ have the meanings given above.

The O-alkyl-O- alkyl -phenylthiophosphoric acid salt of formula (IV) which is the starting material according to variant (b) may be prepared according to conventional method, for example, by treating an O-alkyl-O-substituted-phenylthionophosphoryl chloride with an alkali metal hydroxide. The O-alkyl-O-substituted-phenylthiophosphoric acid salt thus obtained may be used after separation, or it may be directly reacted with the 2-alkoxy-ethyl halide of formula (V) to produce the desired product.

As examples of O-alkyl-O- alkyl -(or unsubstituted)-phenylthiophosphoric acid salts which may be used there are mentioned:

Potassium, sodium or ammonium salts of:
O-ethyl-O-[2-(3- or 4-)methyl]-,
O-ethyl-O-(2-iso-propyl)-,
O-ethyl-O-(2-sec.-butyl)-,
O-ethyl-O-(4-tert.-butyl)-,
O-ethyl-O-(2,4-dimethyl)-,
O-ethyl-O-(3,4-dimethyl)-,
O-ethyl-O-(3,5-dimethyl)-,
O-ethyl-O-(2-iso-propyl-5-methyl)-,
O-ethyl-O-(2-chloro-4-methyl)-,
O-ethyl-O-(2-chloro-6-methyl)-,
O-ethyl-O-(2-methyl-4-chloro)-,
O-ethyl-O-(3-methyl-4-chloro)-,
O-ethyl-O-(2-chloro-4-tert.-butyl)-,
O-ethyl-O-(3,5-dimethyl-4-chloro)-,
O-ethyl-O-(2,4-dichloro-6-methyl)-,
O-n-butyl-O-(3-methyl-4-chloro)-,
O-n-butyl-O-(2,4-dichloro-6-methyl)-,
O-methyl-O-(4-chloro-3,5-dimethyl)-,
O-methyl-O-(4-tert.-butyl)-phenylthiophosphoric
acid, and the like.

As examples of 2-alkoxyethylhalides of formula (V), the other starting material in process variant (b), the following are mentioned:

2-methoxyethyl bromide,
2-ethoxyethyl bromide,
2-n-(or iso-)propoxyethyl bromide,
2-n-butoxyethyl bromide,
the corresponding chlorides or iodides, and the like.

In this process variant, the reactants may be reacted directly, or in the presence of an inert solvent or diluent.

This reaction can be carried out within a fairly wide temperature range, but in general at temperatures from about 0° to 100° C, and preferably from about 30° to 80° C.

Significantly, the active compounds according to the present invention show excellent insecticidal properties and, therefore, they are applicable to the control of various kinds of insect pests, such as sucking insects, biting insects and insect pests parasitic on plants. More precisely, these esters are effectively used as insecticides against agricultural insect pests, such as Coleoptera, Lepidoptera, Aphidae , Orthoptera, Isoptera, Acarina and Nematodes. These esters are effectively used as plant protection agents, especially against rice insect pests, such as rice stem borers, rice green- and leaf-hoppers as well as other insect pests of fruit trees and vegetables. Furthermore, the compounds are characterized by excellent residual effectiveness when used as insecticides in the control of hygienic and storage pests, such as flies, cockroaches, mosquitoes and gnats.

Moreover, the phosphoric acid esters of formula (I) effectively kill or inhibit the reproduction of plant pathogenic fungi, and therefore they are applicable to the control of plant diseases caused by various kinds of fungus. These esters are effectively used as fungicides against plant diseases caused by Archimycetes, Phycomycetes, Ascomycetes, Basidiomycetes, and Fungi Imperfecti. These esters are particularly useful against plant pathogenic fungi of rice, fruit trees and vegetables, with outstanding effects.

To the sucking insects contemplated herein there belong, in the main, aphids (*Aphidae*) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoms infestans*) and, further, cicadas, such as *Euscelis bilobatus*, and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (Euproctis chrysorrhoea) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (Ephestia Kuhniella) and greater wax moth (*Galleria mellonella*); and the like.

Also to be classed with the biting insects contemplated herein are beetles (Coleopters), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius -Acanthoscelides obtectus*), the leather beetle (*Dermestes frischi*), the khapra beetle (*Trogoderma granarium*) the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius* = *Tetranychus althaeae* or *Tetranychus urticae*) and the European red mite (*Paratetranychus pilosus* = *Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, inert gaseous aerosol propellants, and the like. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.) and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0005–20 percent, preferably 0.005–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95 percent, and preferably 0.005–95 percent, by weight of the mixture.

Dosage amounts are generally from 15–1,000 g, preferably 40–600 g of active compound per 10 ares. However, in special cases, it is possible to exceed or reduce the amount and this may sometimes be necessary.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g. about 20–100 percent by weight of the active compound.

Furthermore, the present invention contemplates methods of selectively killing, combating or controlling pests, e.g. insects and fungi, and more particularly methods of combating at least one of insects and fungi which comprises applying to at least one of correspondingly (a) such insects, (b) such fungi, and (c) the corresponding habitat thereof, i.e. the locus to be protected, a correspondingly combative or toxic amount, i.e. an insecticidally or fungicidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

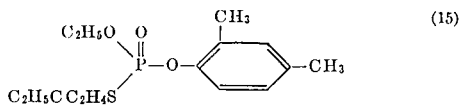

28.5 g of the potassium salt of O-ethyl-O-(2,4-dimethylphenyl) thiophosphoric acid are dissolved in 100 ml of alcohol. 16 g of 2-ethoxyethyl bromide are added to the resulting solution. The mixture is heated at 70°C with stirring for 3 hours. After separation of the inorganic salt produced with filtration, the alcohol is distilled off and the residue is dissolved in benzene. The benzene solution is washed with water and a 1 percent carbonate solution and it is dried over anhydrous sodium sulphate. Upon distilling off the benzene, 22 g of O-ethyl-O-(2,4-dimethyl-phenyl)S-(2-ethoxyethyl)phosphorothiolate are obtained under reduced pressure distillation. B.p. 147° – 153°C/0.08 mmHg, $n_D^{20}$ 1.5129.

EXAMPLE 2

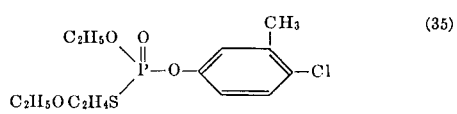

14.3 g of 4-chloro-3-cresol are dissolved in 150 ml of benzene and 10.1 g of triethylamine are added to the resulting solution. 23.3 g of S-(2-ethoxyethyl)-O-ethylthiolphosphorylchloride are added to the mixture at below 10°C while stirring. The reaction mixture is stirred for a while at room temperature after completion of the addition and then it is heated to 60° – 65° C for 3 hours with stirring. When the reaction is complete, the reacted mixture is washed sequentially with water, a 1 percent hydrochloric acid solution, a 1 percent sodium carbonate solution and again water, and then it is dried over anhydrous sodium sulphate. Upon distilling off the benzene, distillation of the residue under reduced pressure gives 24 g of O-ethyl-O-(4-chloro-3-tolyl)-S-(2-ethoxyethyl)phosphorothiolate. B.p. 151-153°C/0.15 mmHg, $n_D^{20}$ 1.5260.

EXAMPLE 3

The following compounds are prepared according to methods analogous to those of Examples 1 and 2. The Table identifies the compounds by giving the meanings of the various variables in formula (I).

TABLE 1

| Compound | $R^1$ | $R^2$ | $R^3n$ | $X_m$ | Physical property (B.p./mmHg; $n_D^{20}$) |
|---|---|---|---|---|---|
| 1 | $C_2H_5$ | $C_2H_5$ | 2-$CH_3$ | — | 138–144/0.1 (1.5112) |
| 2 | $C_2H_5$ | $C_3H_7$—i | 2—$CH_3$ | — | 143–148/0.1 (1.5071) |
| 3 | $C_2H_5$ | $C_2H_5$ | 3—$CH_3$ | — | 142–147/0.1 (1.5129) |
| 4 | $C_2H_5$ | $C_3H_7$—i | 3— $CH_3$ | — | 151–156/0.15 (1.5083) |
| 5 | $C_2H_5$ | $C_2H_5$ | 4—$CH_3$ | — | 130–140/0.07 (1.5125) |
| 6 | $C_2H_5$ | $C_3H_7$—i | 4—$CH_3$ | — | 130–140/0.05 (1.5010) |
| 7 | $C_2H_5$ | $C_2H_5$ | 2—$C_3H_7$ | — | 145–150/0.05 (1.5087) |
| 8 | $C_2H_5$ | $C_3H_7$—n | 2—$C_3H_7$—i | — | 146–149/0.1 (1.5058) |
| 9 | $C_2H_5$ | $C_3H_7$—i | 2—$C_3H_7$—i | — | 149–155/0.07 (1.5036) |
| 10 | $C_2H_5$ | $C_2H_5$ | 2—$C_4H_9$—Sec. | — | 144–149/0.1 (1.5070) |
| 11 | $C_2H_5$ | $C_3H_7$—i | 2—$C_4H_9$—sec. | — | 145–146/0.1 (1.5045) |
| 12 | $CH_3$ | $C_2H_5$ | 4—$C_4H_9$—tert. | — | 135–142/0.1 (1.5174) |
| 13 | $C_2H_5$ | $C_2H_5$ | 4—$C_4H_9$—tert. | — | 143–150/0.2 (1.5076) |
| 14 | $C_2H_5$ | $CH_3$ | 2,4—$(CH_3)_2$ | — | 145–151/0.1 (1.5167) |
| 15 | $C_2H_5$ | $C_2H_5$ | 2,4—$(CH_3)_2$ | — | 147–153/0.08 (1.5129) |
| 16 | $C_2H_5$ | $C_3H_7$—n | 2,4—$(CH_3)_2$ | — | 147–157/0.1 (1.5089) |
| 17 | $C_2H_5$ | $C_3H_7$—i | 2,4—$(CH_3)_2$ | — | 142–148/0.05 (1.5070) |
| 18 | $C_2H_5$ | $C_4H_9$—n | 2,4—$(CH_3)_2$ | — | 149–154/0.05 (1.5053) |
| 19 | $C_2H_5$ | $C_2H_5$ | 3,4—$(CH_3)_2$ | — | 157–163/0.1 (1.5151) |
| 20 | $C_2H_5$ | $C_3H_7$—n | 3,4—$(CH_3)_2$ | — | 159–165/0.1 (1.5109) |
| 21 | $C_2H_5$ | $C_3H_7$—i | 3,4—$(CH_3)_2$ | — | 167–172/0.15 (1.5098) |
| 22 | $C_2H_5$ | $C_2H_5$ | 3,5—$(CH_3)_2$ | — | 137–144/0.15 (1.5109) |
| 23 | $C_2H_5$ | $C_3H_7$—i | 3,5—$(CH_3)_2$ | — | 154–158/0.15 (1.5062) |
| 24 | $C_2H_5$ | $C_2H_5$ | 3—$CH_3$,6—$C_3H_7$—i | — | 156–161/0.06 (1.5082) |
| 25 | $C_2H_5$ | $CH_3$ | 4—$CH_3$ | 2—Cl | 160–170/0.2 (1.5269) |
| 26 | $C_2H_5$ | $C_2H_5$ | 4—$CH_3$ | 2—Cl | 133–140/0.1 (1.5221) |
| 27 | $C_2H_5$ | $C_3H_7$—n | 4—$CH_3$ | 2—Cl | 140–148/0.05 (1.5194) |
| 28 | $C_2H_5$ | $C_3H_7$—i | 4—$CH_3$ | 2-Cl | 149–157/0.1 (1.5181) |
| 29 | $C_2H_5$ | $C_4H_9$—n | 4—$CH_3$ | 2—Cl | 157–166/0.05 (1.5151) |
| 30 | $C_2H_5$ | $C_2H_5$ | 6—$CH_3$ | 2—Cl | 149–156/0.1 (1.5209) |
| 31 | $C_2H_5$ | $C_2H_5$ | 2—$CH_3$ | 4—Cl | 145–153/0.1 (1.5219) |
| 32 | $C_2H_5$ | $C_3H_7$—n | 2—$CH_3$ | 4—Cl | 148–152/0.1.5 (1.5189) |
| 33 | $C_2H_5$ | $C_3H_7$—i | 2—$CH_3$ | 4—Cl | 150–155/0.1 (1.5170) |
| 34 | $C_4H_9$—n | $C_2H_5$ | 3—$CH_3$ | 4—Cl | 159–165/0.1 (1.5171) |
| 35 | $C_2H_5$ | $C_2H_5$ | 3—$CH_3$ | 4—Cl | 151–153/0.15 (1.5260) |
| 36 | $C_2H_5$ | $C_3H_7$—n | 3—$CH_3$ | 4—Cl | 161–165/0.15 (1.5200) |
| 37 | $C_2H_5$ | $C_3H_7$—i | 3—$CH_3$ | 4—Cl | 145–153/0.1 (1.5179) |
| 38 | $CH_3$ | $C_2H_5$ | 3,5—$(CH_3)_2$ | 4—Cl | 148–153/0.15 (1.5362) |
| 39 | $C_2H_5$ | $C_2H_5$ | 3,5—$(CH_3)_2$ | 4—Cl | 150–159/0.05 (1.5231) |
| 40 | $C_2H_5$ | $C_3H_7$—n | 3,5—$(CH_3)_2$ | 4—Cl | 161–169/0.1 (1.5209) |
| 41 | $C_2H_5$ | $C_3H_7$—i | 3,5—$(CH_3)_2$ | 4—Cl | 148–151/0.05 (1.5191) |
| 42 | $C_2H_5$ | $C_2H_5$ | 6—$CH_3$ | 2,4—$Cl_2$ | 152–159/0.1 (1.5331) |
| 43 | $C_2H_5$ | $C_3H_7$—n | 6—$CH_3$ | 2,4—$Cl_2$ | 163–173/0.1 (1.5314) |
| 44 | $C_2H_5$ | $C_3H_7$—i | 6—$CH_3$ | 2,4—$Cl_2$ | 155–161/0.2 (1.5291) |
| 45 | $C_4H_9$ | $C_2H_5$ | 6—$CH_3$ | 2,4—$Cl_2$ | 167–171/0.15 (1.5260) |
| 46 | $C_2H_5$ | $C_2H_5$ | 4—$C_4H_9$—tert | 2—CL | 159–161/0.15 (1.5162) |
| 47 | $C_2H_5$ | $C_3H_7$—n | 4-$C_4H_9$—tert | 2—Cl | 160–166/0.1 (1.5160) |
| 48 | $C_2H_5$ | $C_3H_7$—i | 4-$C_4H_9$—tert | 2—Cl | 153–157/0.08 (1.5132) |

EXAMPLE 4

15 parts by weight of compound 35 of Table 1, 80 parts by weight of a mixture of diatomaceous earth and clay (1:5) and 5 parts by weight of an emulsifier (i.e. polyoxyethylene alkylaryl ether) are mixed and crushed to prepare a wettable powder. This formulation may be diluted with water to the desired concentration and then be used as a ready-to-use-preparation.

EXAMPLE 5

30 parts by weight of compound 7 of Table 1, 30 parts by weight of xylene, 30 parts by weight of Kawakasol (an aromatic hydrocarbon with a boiling range of 150° to 200° C.) and 10 parts by weight of the emulsifier Sorpol (i.e. polyoxyethylene alkylaryl ether) are mixed and stirred to prepare an emulsifiable concentrate. This formulation may be diluted with water to the desired concentration and then used as a ready-to-use-preparation.

EXAMPLE 6

To a mixture consisting of 10 parts by weight of Compound 46 of Table 1, 10 parts by weight of bentonite, 78 parts by weight of a mixture of talc and clay (1:3) and 2 parts by weight of lignin sulfate, 25 parts by weight of water are added and the mixture is firmly kneaded. It is finely cut into granules of 0.5 to 1.5 mm diameter by means of a granulating machine. The granules are then dried at a temperature between 40° to 50° C to obtain a granular formulation. This formulation may directly be applied to the soil.

EXAMPLE 7

2 parts by weight of Compound 28 of Table 1 and 98 parts by weight of a mixture of talc and clay (1:3) are mixed and crushed to prepare a dust. This formulation may directly be used as a ready-to-use-preparation.

EXAMPLE 8

Insecticidal test against tobacco cutworm larvae

| | |
|---|---|
| Solvent: | 5 parts by weight of aceton |
| Emulsifier: | 1 part by weight of polyoxyethylene alkylarylether |

To prepare a suitable preparation preparation of the active compound, 1 part by weight of the active compound was thoroughly mixed with the stated amount of solvent and the stated amount of emulsifier. The obtained emulsifiable concentrate was then diluted with water to the desired concentration.

Leaves of sweet potato were dipped in the diluted preparation of the active compound and then dried and put in a Petri dish of 9 cm diameter. 10 tobacco cutworm larvae were then placed in the dish. The dish was kept at a temperature of 28° C. 30 test insects were used altogether for each active compound at each concentration.

After 24 hours, the number of dead insects were counted and the mortality rate was calculated as a percentage. 100 percent means that all insects were killed, 0 percent means that none of the insects were killed.

The average results obtained are shown in the Table 2.

TABLE 2

Results of test against tobacco cutworm (*Prodenia litura*) larvae

| Compound of Table 1 | Mortality at a concentration of active ingredient of | | |
|---|---|---|---|
| | 1,000 ppm | 300 ppm | 100 ppm |
| 1 | 100% | 100% | 40% |
| 2 | 100 | 100 | 50 |
| 3 | 100 | 100 | 20 |
| 4 | 100 | 100 | 40 |
| 5 | 100 | 100 | 50 |
| 6 | 100 | 100 | 80 |
| 7 | 100 | 100 | 100 |
| 8 | 100 | 100 | 90 |
| 9 | 100 | 100 | 90 |
| 10 | 100 | 100 | 30 |
| 11 | 100 | 100 | 50 |
| 12 | 100 | 100 | 70 |
| 13 | 100 | 100 | 80 |
| 14 | 100 | 70 | 60 |
| 15 | 100 | 100 | 70 |
| 16 | 100 | 100 | 100 |
| 17 | 100 | 100 | 100 |
| 18 | 100 | 100 | 80 |
| 19 | 100 | 100 | 80 |
| 20 | 100 | 100 | 100 |
| 21 | 100 | 100 | 100 |
| 22 | 100 | 100 | 100 |
| 23 | 100 | 100 | 90 |
| 24 | 100 | 90 | 20 |
| 25 | 100 | 60 | |
| 26 | 100 | 100 | 80 |
| 27 | 100 | 100 | 40 |
| 28 | 100 | 100 | 70 |
| 29 | 100 | 90 | 40 |
| 30 | 100 | 100 | 100 |
| 31 | 100 | 100 | 100 |
| 32 | 100 | 100 | 100 |
| 33 | 100 | 100 | 100 |
| 34 | 100 | 70 | 10 |
| 35 | 100 | 100 | 100 |
| 36 | 100 | 100 | |
| 37 | 100 | 100 | 100 |
| 38 | 100 | 100 | 40 |
| 39 | 100 | 100 | 100 |
| 40 | 100 | 100 | 80 |
| 41 | 100 | 100 | 100 |
| 42 | 100 | 100 | 100 |
| 43 | 100 | 100 | 100 |
| 44 | 100 | 100 | 100 |
| 45 | 100 | 100 | |
| 46 | 100 | 100 | 100 |
| 47 | 100 | 100 | 90 |
| 48 | 100 | 100 | 100 |
| Control A | 100 | 80 | 40 |
| Control B | 100 | 90 | 10 |

Notes: 1. Control A: O,O-dimethyl-O-(3-methyl-4-nitrophenyl) thiophosphate (Sumithion)
2. Control B: O-ethyl-O-(4-chlorophenyl)-S-(2-ethylthioethyl)-phosphorothiolate

EXAMPLE 9

Controlling effect test against carmine mite (*Tetranychus telarius*)

On the first two leaves of kidney bean seedlings, each of which was grown in pots of 6 cm in diameter, 50 – 100 mature and infant carmine mites with organophosphorus acaricide resistance were placed. After 2 days, the preparation of the active compounds (prepared in the same manner described in Example 8) was sprayed until dripping wet. The so-treated pots were then placed in a greenhouse at the temperature of 25°C.

After 10 days, the controlling effect was evaluated according to the following scale:

3    The proportion of surviving adult and young mites as well as eggs is 0 percent.
2    The proportion of surviving adult and young mites as well as eggs is less than 5 percent of that of the non-treated group.
1    The proportion of surviving adult and young mites as well as eggs is 5–50 percent of that of the non-treated group.
0    The proportion of surviving adult and young mites as well as eggs is more than 50 percent of that of the non-treated group.

The average results obtained are shown in the Table 3 below.

TABLE 3

Results of test against carmine mite

| Compound of Table 1 | Acaricidal effect at a concentration of active ingredient of | | |
|---|---|---|---|
| | 1,000 ppm | 300 ppm | 100 ppm |
| 13 | 3 | 3 | 2 |
| 26 | 3 | 3 | 2 |
| 28 | 3 | 3 | 2 |
| 31 | 3 | 3 | 1 |
| 33 | 3 | 3 | 3 |
| 35 | 3 | 3 | 2 |
| 42 | 3 | 3 | 3 |
| 46 | 3 | 3 | 3 |
| 47 | 3 | 3 | 3 |
| 48 | 3 | 3 | 3 |
| Control B | 3 | 3 | 1 |

Note: Control B: O-ethyl-O-(4-chlorophenyl)-S-(2-ethylthioethyl)phosphorothiolate

EXAMPLE 10

Test against rice stem borer (*Chilo supperssalis*) larvae

Egg masses of rice stem borer were attached to paddy rice plants of tillering stage, 3 to 5 of which being in one pot of about 12 cm diameter. 7 days after the hatching of the eggs, such plants were sprayed with the preparation of the active compound (prepared in the same manner described in Example 8) until dripping wet. 3 pots were used for each active compound at each concentration. The pots were placed in a greenhouse and the temperature was maintained at 25° C. Three days after the spraying, the stems of the plants were split by hand and the numbers of surviving dead insects in the stems were counted and the mortality rate was calculated as a percentage. 100 percent means that all the insects were killed, 0 percent means that none of the insects were killed.

The average results obtained are shown in the Table 4 below.

TABLE 4

Results of test against rice stem borer larvae

| Compound of Table 1 | Concentration | Mortality |
|---|---|---|
| 3 | 250 ppm | 100% |
| 5 | 250 | 100 |
| 6 | 250 | 100 |
| 7 | 250 | 96.1 |
| 8 | 250 | 100 |
| 9 | 250 | 95.8 |
| 13 | 250 | 100 |
| 14 | 250 | 100 |
| 15 | 250 | 100 |
| 16 | 250 | 100 |
| 17 | 250 | 100 |
| 19 | 250 | 100 |
| 20 | 250 | 100 |
| 21 | 250 | 100 |
| 25 | 250 | 100 |

| | | |
|---|---|---|
| 26 | 250 | 100 |
| 27 | 250 | 100 |
| 28 | 250 | 96.9 |
| 29 | 250 | 96.1 |
| 31 | 250 | 100 |
| 32 | 250 | 100 |
| 33 | 250 | 81.8 |
| 35 | 250 | 100 |
| 37 | 250 | 100 |
| 42 | 250 | 100 |
| 46 | 250 | 100 |
| Control C | 250 | 95 |
| Control D | 250 | 100 |

Notes: 1. Control C: O,O-dimethyl-2,2,2-trichloro-1-hydroxyethylphosphonate (Dipterex)
2. Control D: O,O-dimethyl-O-[4-(methylthio-3-methyl)phenyl]thiophosphate (Le-Baycid)

EXAMPLE 11

Test against the adult house-fly (*Musca domestica*)

1 ml of the diluted preparation of the active compound (prepared in the same manner described in Example 8) was adsorbed onto filter paper placed in a Petri dish of 9 cm diameter. 10 mature female adult house flies were then placed in the Petri dish. The dish was kept at a temperature of 28° C. 30 test insects were used altogether for each active compound at each concentration.

After 24 hours, the number of dead insects was counted and the mortality rate was calculated as a percentage. 100 percent means that all insects were killed, 0 percent means that none of the insects were killed.

The average results obtained are shown in the Table 5 below.

TABLE 5.

Results of test against the adult house-fly

| Compound of Table I | Mortality at a concentration of | |
|---|---|---|
| | 1,000 ppm | 100 ppm |
| 3 | 100% | 100% |
| 5 | 100 | 60 |
| 6 | 100 | 70 |
| 7 | 100 | 40 |
| 8 | 100 | 20 |
| 9 | 100 | 100 |
| 14 | 100 | 10 |
| 15 | 100 | |
| 16 | 100 | 10 |
| 17 | 100 | 40 |
| 18 | 100 | 30 |
| 19 | 100 | 70 |
| 20 | 100 | 30 |
| 25 | 100 | 90 |
| 26 | 100 | 30 |
| 27 | 100 | 100 |
| 28 | 100 | 100 |
| 29 | 100 | 30 |
| 31 | 100 | 90 |
| 32 | 100 | 100 |
| 33 | 100 | 100 |
| 35 | 100 | 100 |
| 37 | 100 | 100 |
| DDT (Control) | 100 | 20 |
| γ-BHC (Control) | 100 | 90 |

EXAMPLE 12.

Test against German cockroaches (*Blatella germanica*)

The test was carried out in the same manner as that of Example 11, using the German cockroach instead of the house fly.

The average results obtained are shown in the Table 6 below.

TABLE 6

Results of test against German cockroaches

| Compound of Table 1 | Mortality at a concentration of | |
|---|---|---|
| | 1,000 ppm | 100 ppm |
| 3 | 100% | 100% |
| 5 | 100 | |
| 6 | 100 | |
| 7 | 100 | |
| 8 | 100 | |
| 9 | 100 | 100 |
| 14 | 100 | |
| 15 | 100 | |
| 16 | 100 | |
| 17 | 100 | |
| 18 | 100 | |
| 19 | 100 | |
| 20 | 100 | |
| 21 | 100 | |
| 25 | 100 | |
| 26 | 100 | |
| 27 | 100 | 100 |
| 28 | 100 | 80 |
| 29 | 100 | |
| 31 | 100 | |
| 32 | 100 | 100 |
| 33 | 100 | 100 |
| 35 | 100 | 100 |
| 37 | 100 | 100 |

EXAMPLE 13

Test against rice blast (*Piricularia oryzae*)/(pot test)

Solvent: 5 parts by weight of aceton
Emulsifier: 1 part by weight of polyoxyethylene alkylarylether To prepare a suitable preparation of the active compound, 1 part by weight of the active compound was thoroughly mixed with the stated amount of solvent and the stated amount of emulsifier. The obtained emulsifiable concentrate was then diluted with water to the desired concentration.

a. Test of Protective Effect:

Rice plants (Jukkoku variety) were grown in pots each having a diameter of 12 cm. In the tillering stage, such plants were sprayed with the preparation of the active compound until dripping wet.

For the next 2 days, the treated pots were placed in a chamber at a temperature of 25° C and a relative atmospheric humidity of about 100 percent. Twice during this time, such plants were inoculated by spraying with a suspension of cultured spores of Piricularia oryzae.

Seven days after inoculation, the degree of infestation was determined by applying a scale ranging from 0 to 5, and the protective value of each particular active compound against Piricularia oryzae was determined in accordance with the formula below.

At the same time, the phytotoxity against rice plants was determined.

| Degree of infestation | Infested area of leaf in % of total leaf |
|---|---|
| 0 | 0 % |
| 0.5 | 0 – 2 % |
| 1 | 2 – 5 % |
| 2 | 5 – 10 % |
| 3 | 10 – 20 % |
| 4 | 20 – 40 % |
| 5 | 40 or more % |

$$\text{Protective value} = 100 - \frac{\text{Degree of infestation of treated plants}}{\text{Degree of infestation of non-treated plants}} \times 100$$

The particular active compounds tested, their concentrations and the average results obtained can be seen from the following Table 7.

TEST EXAMPLE 14

Test against rice sheath blight (Pellicularia sasakii)/(pot test)

Rice plants (Kinmaze variety) were grown in pots each having a diameter of 12 cm. In the beginning of the tillering stage, the preparation of active compound (prepared in the same manner described in Example 13) was sprayed onto the test plant until dripping wet.

On the next day, the schlerotium of *Pellicularia sasakii*, obtained by culturing for 10 days in a wheat culture medium, was inoculated onto the roots of the plants. The pots were then maintained for 8 days in a chamber at a temperature between 28 and 30°C and a relative atmospheric humidity of at least 95 percent.

The infestation of the stems was determined and characterized by the values $n_0$ to $n_3$ having the meaning given below.

The degree of infestation was determined by means of the formula (1) and the protective value of each compound was calculated in accordance with the formula (2):

wherein
$N$ = the number of the total stems examined
$n_0$ = the number of non-infested stems
$n_1$ = the number of stems infested up to the first leaf (from the bottom)
$n_2$ = the number of stems infested up to the second leaf (from the bottom)
$n_3$ = the number of stems infested up to and above the third leaf (from the bottom)

The active compounds tested, their concentrations and the average results can be seen from the following Table 7.

TABLE 7

Results of tests against rice blast and sheath blight

| Compound of Table 1 | Concentration of active ingredient, ppm | Protective valve of blast (Piricularia oryzae) | Protective valve of sheath blight (Pellicularia Sasakii) | Phytotoxicity |
|---|---|---|---|---|
| 5 | 500 | | 67 | — |
| 6 | 500 | | 82 | — |
| 31 | 500 | 80 | 78 | — |
| 34 | 500 | 80 | | — |
| 35 | 500 | 78 | 83 | — |
| Control E | 500 | 75 | 64 | — |
| Non-treatment | — | 0 | 0 | — |

Notes: 1. Phytotoxicity: '—' means that no ill effect on the growth of rice plants was seen.
2. Control E: O,O-diisopropyl-S-benzylthiolphosphate (IBP)

It will be appreciated that the instant specification and examples are set forth by way of illustration and not limitation and that various modifications and changes may be made without departing from the spirit and scope of the present invention.

What is claimed is:

1. Phosphorothiolates of the formula

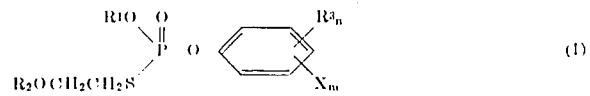

in which
$R^1$, $R^2$ and $R^3$ are lower alkyl radicals,
X is halogen,
$m$ is 0 to 2, the halogens when present being in the 2-,4- or 2,4-positions and
$n$ is 1 or 2.

2. A phosphorothiolate according to claim 1, wherein $R^1$, $R^2$ and $R^3$ are alkyl of one to four carbon atoms, X is chlorine or bromine, $m$ is 0 to 2, and $n$ is 1 or 2.

3. A phosphorothiolate according to claim 1, wherein $R^1$ is alkyl of one to two carbon atoms, $R^2$ is alkyl of one to three carbon atoms, $R^3$ is methyl, X is chlorine, $m$ is 0 to 2 and $n$ is 1 or 2.

4. Compound according to claim 1 wherein such compound is O-ethyl-O-(3-tolyl)-S-(2-ethoxyethyl)phosphorothiolate of the formula

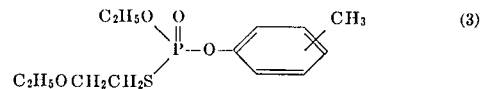

5. Compound according to claim 1 wherein such compound is O-ethyl-O-(2-isopropyl-phenyl)-S-(2-isopropoxyethyl)phosphorothiolate of the formula

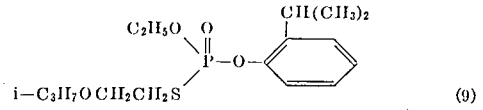

6. Compound according to claim 1 wherein such compound is O-ethyl-O-(3,4-dimethylphenyl)-S-(2-n-propylethyl)phosphorothiolate of the formula

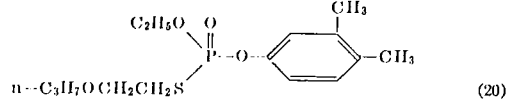

7. Compound according to claim 1 wherein such compound is O-ethyl-O-(4-chloro-2-tolyl)-S-(2-n-propoxyethyl)phosphorothiolate of the formula

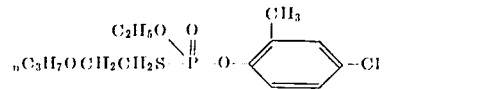

8. Compound according to claim 1 wherein such compound is O-ethyl-O-(4-chloro-2-tolyl)-S-(2-isopropoxyethyl)phosphorothiolate of the formula

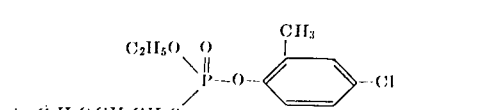

9. Compound according to claim 1 wherein such compound is O-ethyl-O-(4-chloro-3-tolyl)-S-(2-ethoxyethyl)phosphorothiolate of the formula

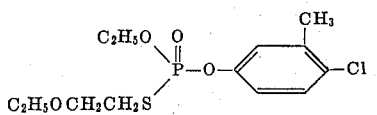
(35)
10. Compound according to claim 1 wherein such compound is O-ethyl-O-(4-chloro-3-tolyl)-S-(2-isopropoxyethyl)phosphorothiolate of the formula
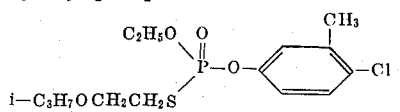
(37)
11. Compound according to claim 1 wherein such compound is O-ethyl-O-(4,6-dichloro-2-tolyl)-S-(2-isopropoxyethyl)phosphorothiolate of the formula
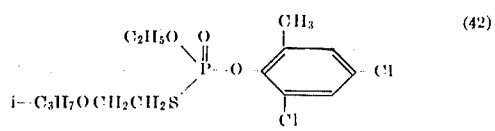
(42)
* * * * *

UNITED STATES PATENT OFFICE
CERTIFICATE OF CORRECTION

Patent No. 3,683,053              Dated August 8, 1972

Inventor(s) Shigeo Kishino et al.

It is certified that error appears in the above-identified patent and that said Letters Patent are hereby corrected as shown below:

On the cover sheet insert -- Claims priority, application Japan, Sept. 17, 1969 Sho 44-73204 --.

Signed and sealed this 26th day of March 1974.

(SEAL)
Attest:

EDWARD M. FLETCHER, JR.  
Attesting Officer

C. MARSHALL DANN  
Commissioner of Patents